US011990708B2

(12) United States Patent
Gao et al.

(10) Patent No.: US 11,990,708 B2
(45) Date of Patent: May 21, 2024

(54) ELECTRICAL CONNECTOR

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Sheng-Pin Gao, Kunshan (CN); Yong-Chun Xu, Kunshan (CN); Hung-Chi Yu, New Taipei (TW); Chih-Ching Hsu, New Taipei (TW); Jie Zhang, Kunshan (CN); Chin-Jung Wu, New Taipei (TW)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 52 days.

(21) Appl. No.: 17/702,031

(22) Filed: Mar. 23, 2022

(65) Prior Publication Data

US 2022/0311188 A1 Sep. 29, 2022

(30) Foreign Application Priority Data

Mar. 24, 2021 (CN) ......................... 202110311578.9
Mar. 24, 2021 (CN) ......................... 202110311598.6

(51) Int. Cl.
*H01R 13/6461* (2011.01)
*H01R 13/42* (2006.01)
*H01R 13/7193* (2011.01)
*H01R 24/64* (2011.01)
*H01R 107/00* (2006.01)

(52) U.S. Cl.
CPC ......... *H01R 13/6461* (2013.01); *H01R 13/42* (2013.01); *H01R 13/7193* (2013.01); *H01R 24/64* (2013.01); *H01R 2107/00* (2013.01); *H01R 2201/04* (2013.01)

(58) Field of Classification Search
CPC ................ H01R 13/6461; H01R 13/42; H01R 13/7193; H01R 24/64; H01R 2107/00
USPC .......................................................... 439/620
See application file for complete search history.

(56) References Cited

U.S. PATENT DOCUMENTS

| | | | | |
|---|---|---|---|---|
| 6,413,120 | B1 * | 7/2002 | Winings | H01R 24/64 439/541.5 |
| 7,121,898 | B2 * | 10/2006 | Murr | H01R 24/64 439/676 |
| 8,147,278 | B2 * | 4/2012 | Renteria | H01R 24/64 439/676 |
| 8,337,217 | B2 * | 12/2012 | Roberts | H05K 13/046 439/68 |

(Continued)

*Primary Examiner* — Alexander Gilman
(74) *Attorney, Agent, or Firm* — Ming Chieh Chang

(57) ABSTRACT

An electrical connector includes: an insulating body defining a mating space; and a terminal module assembled to the insulating body and having a circuit board and plural mating terminals mounted on the circuit board, wherein: each of the mating terminals has a contact portion extending obliquely backward, a bending portion bent backward from a front end of the contact portion, a connecting portion extending rearward from a rear end of the bending portion, and a mounting portion vertically extending from a rear end of the connecting portion for mounting on the circuit board; and a front end of the circuit board extends forward into the mating space.

14 Claims, 18 Drawing Sheets

(56) References Cited

U.S. PATENT DOCUMENTS

| | | | | |
|---|---|---|---|---|
| 8,529,296 | B2 * | 9/2013 | Lee | H01R 13/6658 439/487 |
| 8,529,297 | B2 * | 9/2013 | Chang | H01R 13/6658 439/620.24 |
| 8,764,493 | B2 * | 7/2014 | Renteria | H01R 12/70 439/676 |
| 9,484,694 | B2 * | 11/2016 | Mateo Ferrús | H01R 31/06 |
| 9,520,687 | B2 * | 12/2016 | Gao | H01R 13/7193 |
| 9,525,242 | B1 * | 12/2016 | Lou | H01R 24/64 |
| 9,531,143 | B2 * | 12/2016 | Gao | H01R 24/64 |
| 10,333,243 | B2 * | 6/2019 | Tang | H01R 12/7011 |
| 2004/0242077 | A1 * | 12/2004 | Chang | H01R 13/6658 439/676 |
| 2005/0202697 | A1 * | 9/2005 | Caveney | H01R 24/64 439/77 |
| 2007/0015416 | A1 * | 1/2007 | Gutierrez | H01R 24/64 439/676 |
| 2011/0097935 | A1 * | 4/2011 | Schempp | H01R 12/57 439/620.22 |
| 2014/0194009 | A1 * | 7/2014 | Zhang | H01R 13/6658 439/676 |
| 2015/0147914 | A1 * | 5/2015 | Gao | H01R 13/514 439/638 |
| 2016/0056579 | A1 * | 2/2016 | Lindkamp | H01R 13/6466 439/620.21 |
| 2016/0056595 | A1 * | 2/2016 | Gao | H01R 13/642 439/345 |
| 2016/0056596 | A1 * | 2/2016 | Gao | H01R 24/64 439/38 |
| 2016/0064878 | A1 * | 3/2016 | Ku | H01R 12/716 439/78 |
| 2022/0311188 | A1 * | 9/2022 | Gao | H01R 13/6461 |

* cited by examiner

ELECTRICAL CONNECTOR

BACKGROUND OF THE INVENTION

1. Field of the Invention

The present invention relates generally to an electrical connector, and more particularly to an electrical connector capable of transmitting high-speed signals.

2. Description of Related Arts

With the increase of data transmission speed, the electromagnetic interference in an RJ45 connector will increase, making the traditional RJ45 connector unable to meet the requirements of higher transmission rates. The length of the signal transmission path inside the connector is critical to the performance of the signal transmission. U.S. Pat. No. 10,333,243 discloses a traditional RJ45 connector, the electrical length from the contact point of the mating terminal and the RJ45 plug connector to the connection point of the foot terminal and the external device is long. Therefore, the loss is large and may not meet the requirements of high-speed network signal transmission.

An improved electrical connector is desired.

SUMMARY OF THE INVENTION

A main object of the present invention is to provide an electrical connector suitable for transmitting high-speed signals.

To achieve the above-mentioned object, an electrical connector comprises: an insulating body defining a mating space; and a terminal module assembled to the insulating body and having a circuit board and a plurality of mating terminals mounted on the circuit board; wherein each of the mating terminals has a contact portion extending obliquely backward, a bending portion bent backward from a front end of the contact portion, a connecting portion extending rearward from a rear end of the bending portion, and a mounting portion vertically extending from a rear end of the connecting portion for mounting on the circuit board; and a front end of the circuit board extends forward into the mating space.

To achieve the above-mentioned object, an electrical connector comprises: an insulating body; a circuit board mounted on the insulating body; and a plurality of mating terminals mounted on the circuit board; wherein each of the mating terminals has a contact portion extending obliquely backward, a bending portion bent backward from a front end of the contact portion, a connecting portion extending rearward from a rear end of the bending portion, and a mounting portion vertically extending from a rear end of the connecting portion and mounted on the circuit board; and the contact portion extends backward beyond the mounting portion.

Compared to prior art, in the electrical connector of the present invention, the front end of the circuit board extends forward into the mating space or he contact portion extends backward beyond the mounting portion to shorten the length of the signal transmission path on the mating terminal. Therefore, the electrical length from the contact point of the mating terminal and a mating connector to the external device is shortened, so as to meet the requirements of the transmission speed of 25 Gbps and above.

DETAILED DESCRIPTION OF THE PREFERRED EMBODIMENT

Figure 1:
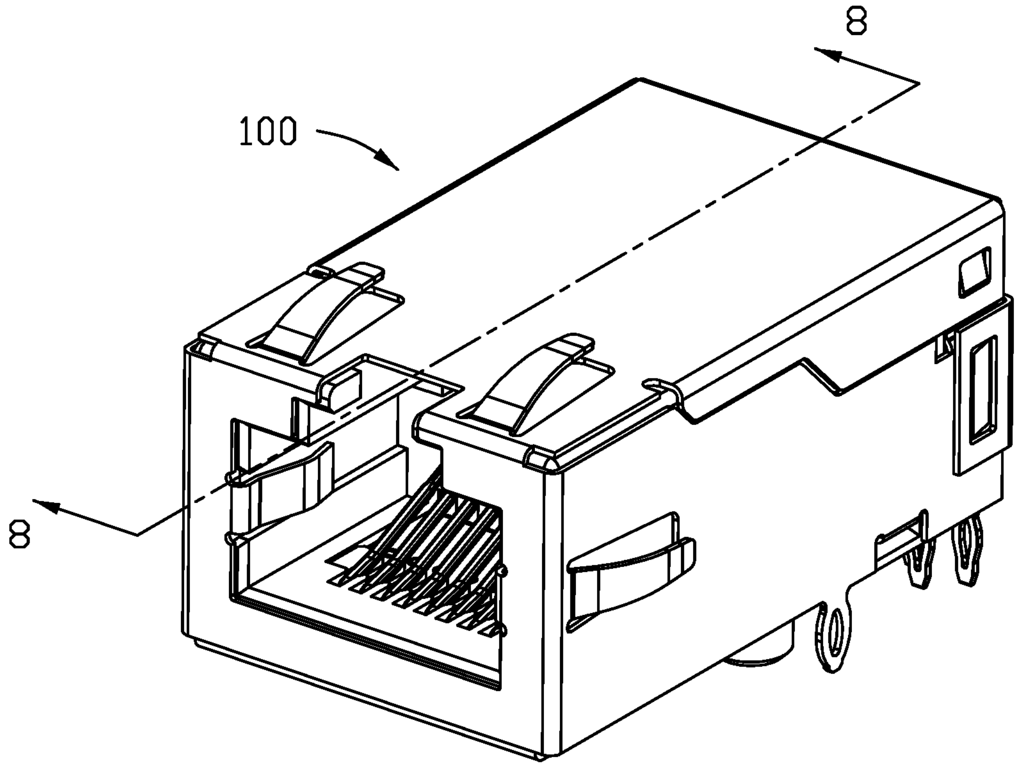
FIG. 1 is a perspective view of a first embodiment of an electrical connector in accordance with the present invention.
Figure 2:
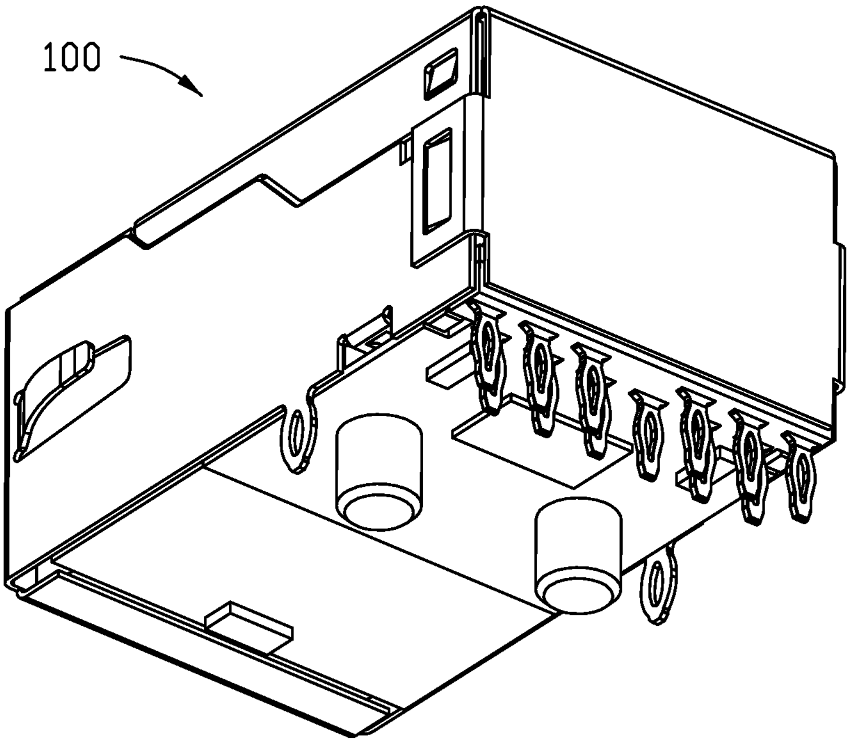
FIG. 2 is another perspective view of the electrical connector in FIG. 1.
Figure 3:
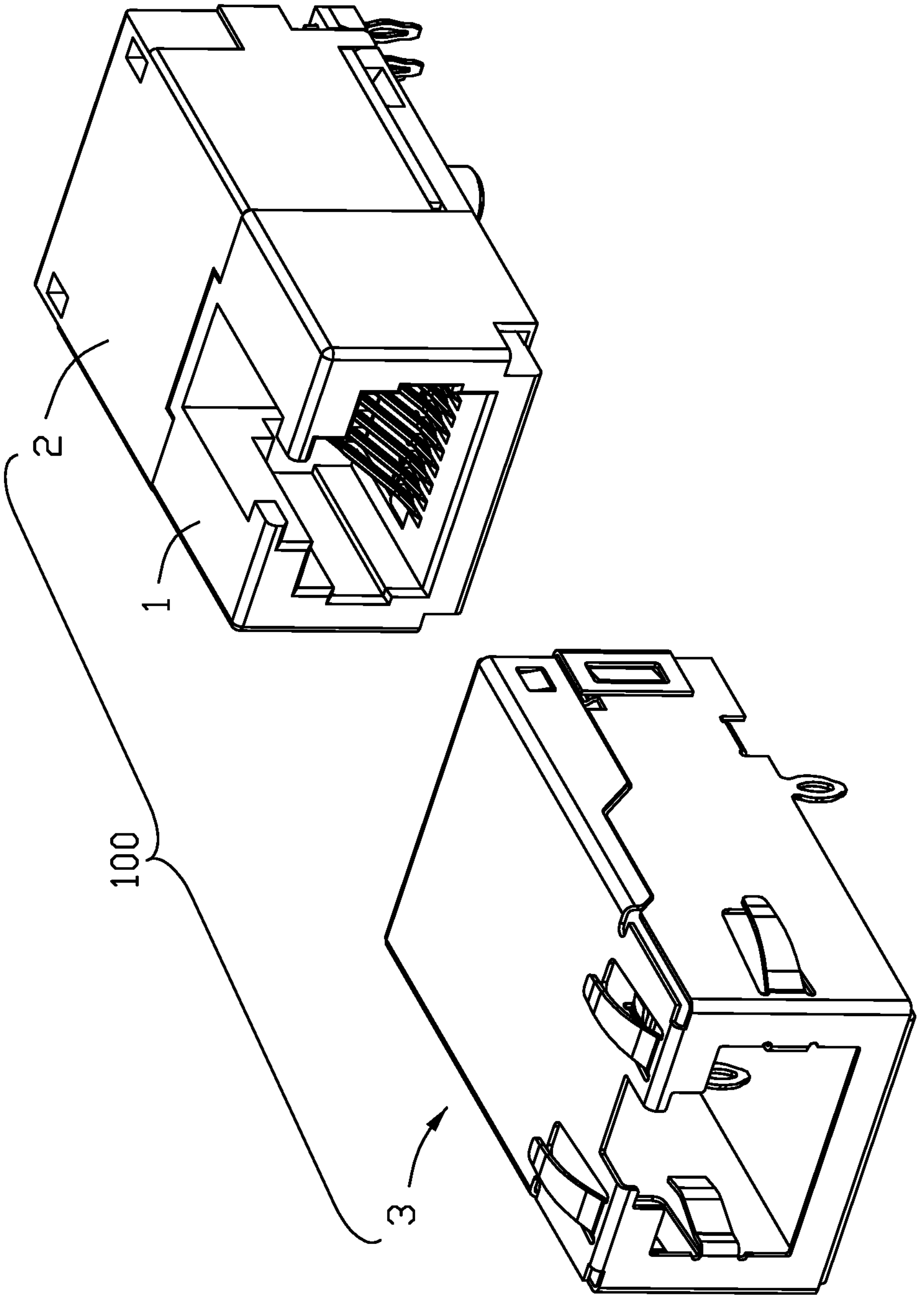
FIG. 3 is an exploded view of the electrical connector in FIG. 1.
Figure 4:
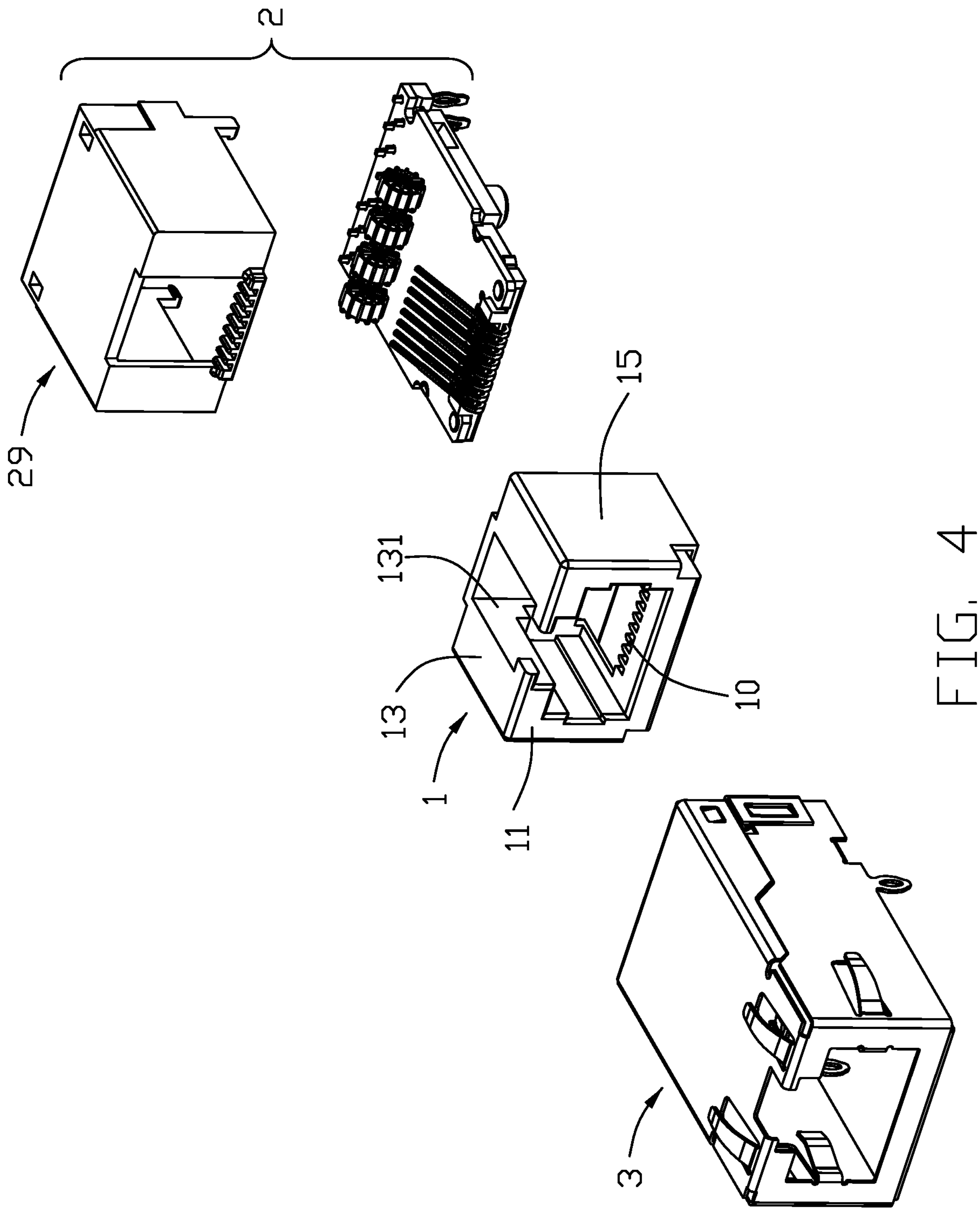
FIG. 4 is a further exploded view of the electrical connector in FIG. 3.
Figure 5:
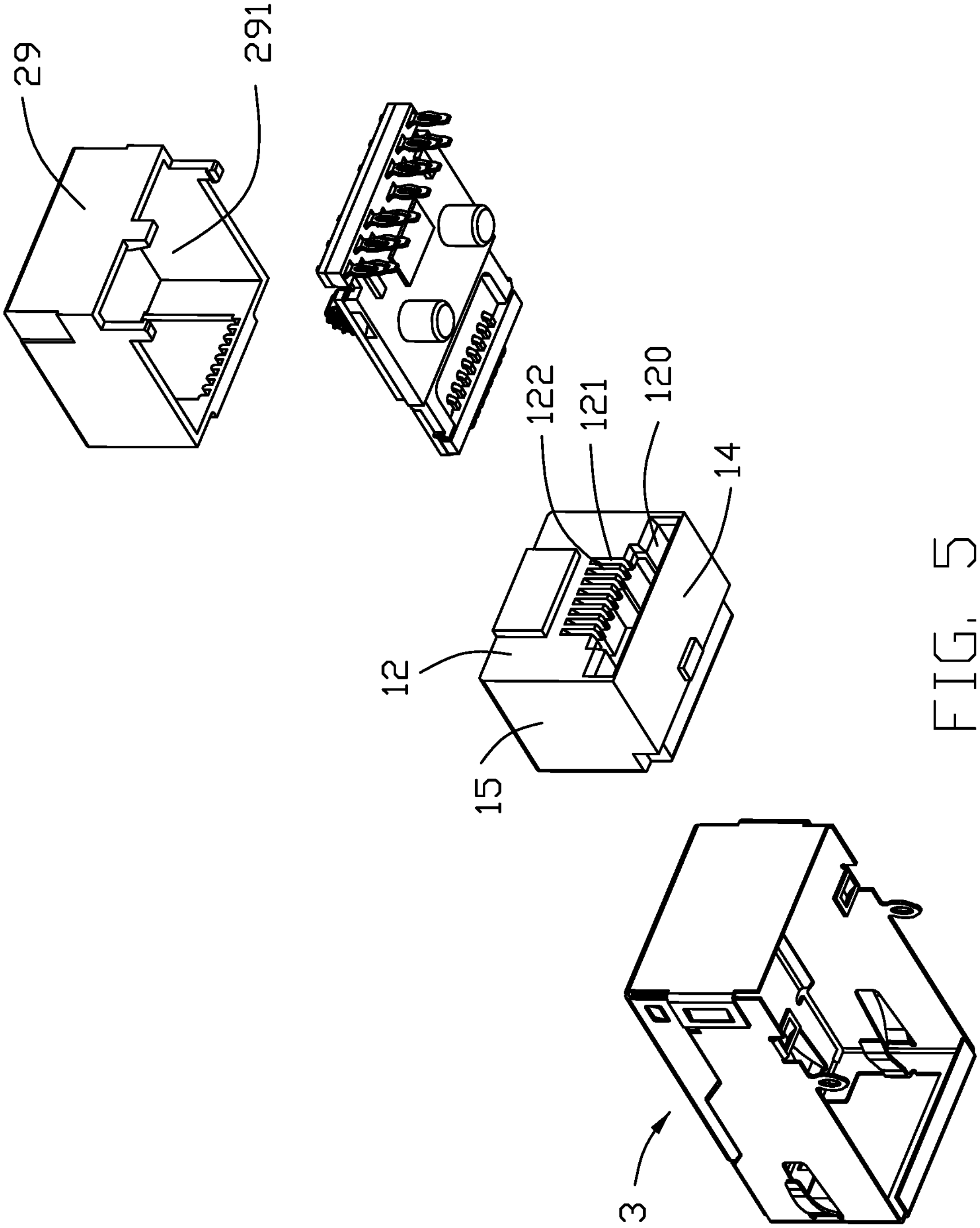
FIG. 5 is another exploded view of the electrical connector in FIG. 4.
Figure 6:
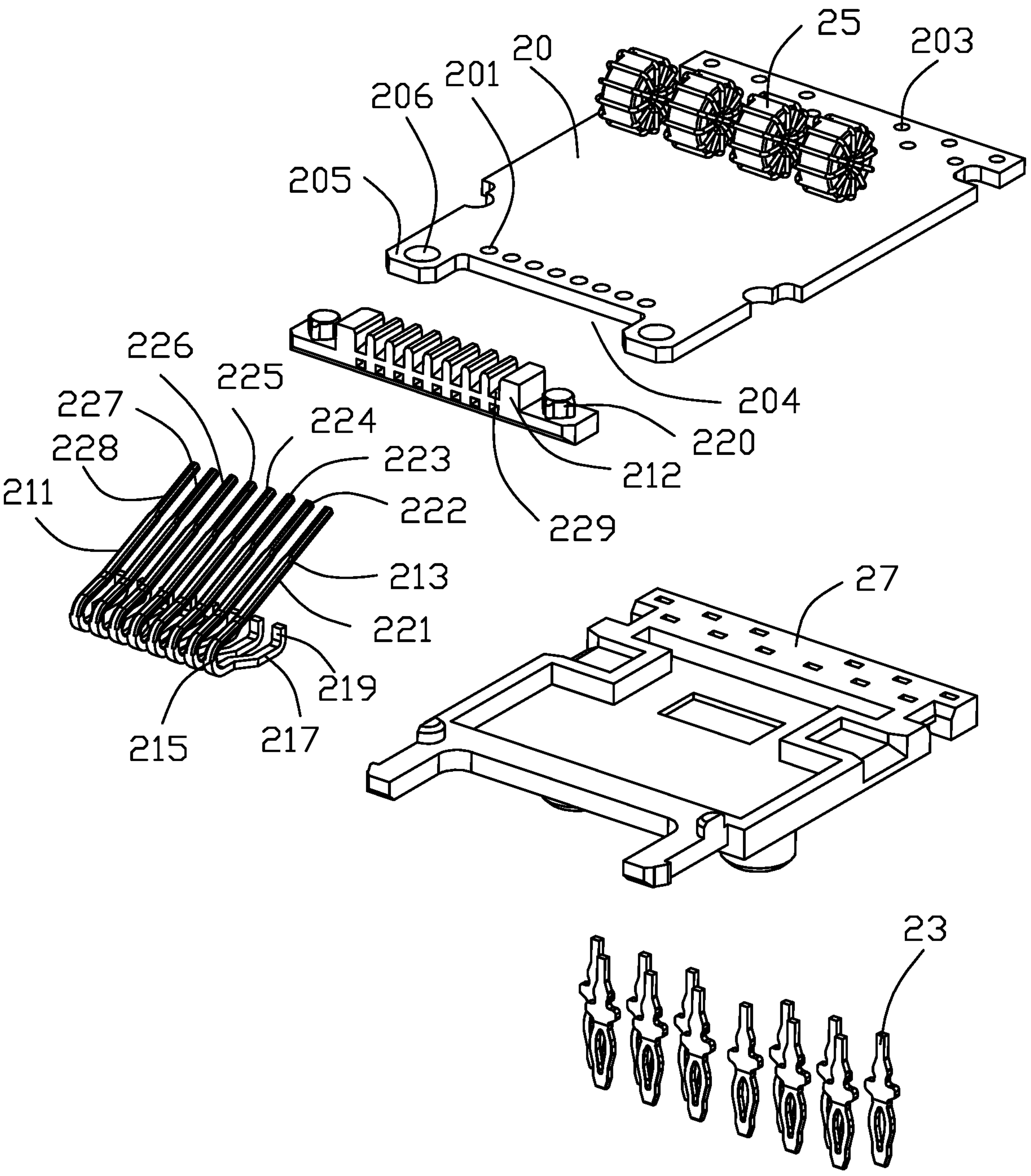
FIG. 6 is an exploded view of the terminal module of the electrical connector in FIG. 1.
Figure 7:
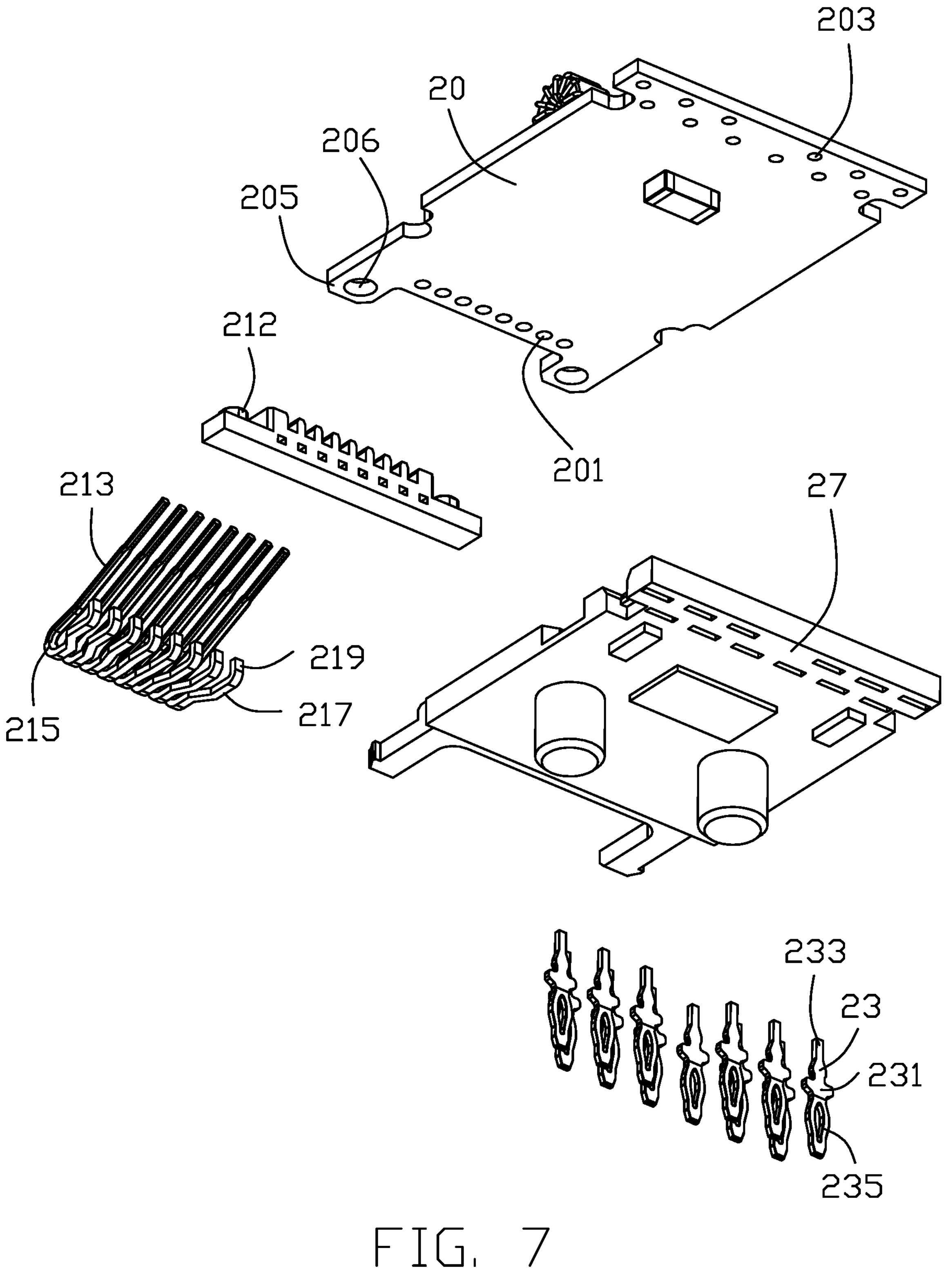
FIG. 7 is another exploded view of the terminal module in FIG. 6.
Figure 8:
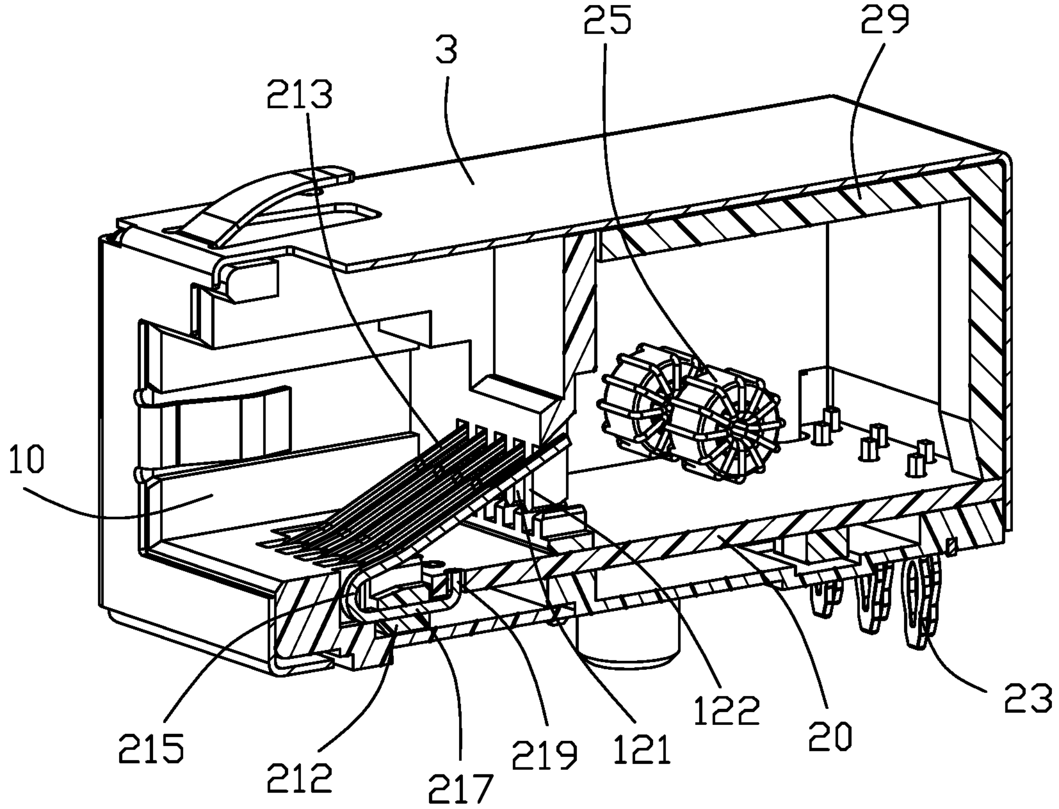
FIG. 8 is a cross-sectional view along line 8-8 of the electrical connector in FIG. 1.

Referring to FIGS. 1-8, a first embodiment of an electrical connector 100 of the present invention is shown. The electrical connector 100 can be mated with a mating connector (not shown) and can be mounted to an external device (not shown) to transmit network signals between the mating connector and external devices. The electrical connector 100 of the present invention is an RJ45 connector, which can support the transmission of high-speed signals of 25 Gbps, 40 Gbps and above.

The electrical connector 100 comprises an insulating body 1, a terminal modules 2 installed on the insulating body 1, and a metal shielding shell 3 covering the insulating body 1 and the terminal module 2.

The insulating body 1 includes a front wall 11, a rear wall 12, a top wall 13, a bottom wall 14, and two side walls 15. The walls together form a mating space 10 for accommodating the mating connector. The top wall 13 is provided with a snap groove 131 penetrating therethrough in the up-down direction. The snap groove 131 is used for snap with the snap tail (not shown) of the mating connector. The lower side of the rear wall 12 is provided with a through groove 120 penetrating therethrough in the front-rear direction. The through groove 120 communicates with the mating space 10. The rear wall 12 is provided with a row of transversely arranged partition grooves 121 therethrough, and partition arms 122 located between two adjacent partition grooves 121. The partition grooves 121 communicates with the mating space 10 in the front-rear direction, and communicates with the through groove 120 in the up-down direction. A receiving member 29 disposed on the upper side of the circuit board 20 for receiving the magnetic module 25

The terminal module 2 comprises a horizontally arranged circuit board 22, a terminal assembly 21 mounted on the front of the circuit board 20, a plurality of foot terminals 23 mounted on the rear of the circuit board 20 and can be mounted to the external device, a magnetic module 25 electrically connected between the terminal assembly 21 and the foot terminal 23, an insulating carrier 27 arranged on the lower side of the circuit board 20 for fixing the foot terminals 23 and a receiving member 29 arranged on the upper side of the circuit board 20 for accommodating the magnetic module 25. The insulating carrier 27 can be mounted down to the external device.

The front of the circuit board 20 has a row of mounting holes 201. The rear of the circuit board 20 has a plurality of rear mounting holes 203. The central position of the front end of the circuit board 20 is retracted backward to form a recessed portion 204, and the two sides of the front end of the circuit board 20 formed a forward protruding portion 205 relative to the recessed portion 204.

The terminal assembly 21 includes a plurality of mating terminals 211 for mating with the mating connector and a fixing block 212 for fixing the mating terminals 211 as a whole. The mating terminal 211 includes a first mating terminal 221 to an eighth mating terminal 228 arranged in sequence in the lateral direction, wherein the first mating terminal 221 and the second mating terminal 222 form a differential terminal pair, the third mating terminal 223 and the sixth mating terminal 226 form a differential terminal pair, the fourth mating terminal 224 and the fifth mating terminal 225 form a differential terminal pair, and the seventh mating terminal 227 and the eighth mating terminal 228 form a differential terminal pair. Each of the differential terminal pair is used for transmit a pair of differential signals. The distance between the third terminal 223 and the fourth terminal 224, and the distance between the fifth mating terminal 225 and the sixth mating terminal 226 are greater than the distance between the other two adjacent mating terminals, so as to reduce the crosstalk between the third mating terminal 223 to the sixth mating terminal 226.

Each of the mating terminals 211 includes a contact portion 213 extending obliquely backward and upward, a C-shaped bending portion 215 bent upward and backward from the front end of the contact portion 213, a connecting portion 217 extending backward from the rear end of the bending portion 215, and a mounting portion 219 extending vertically upward from the rear end of the connecting portion 217. The connecting portion 217 extends horizontally backward. The contact portion 213 extends backward beyond the mounting portion 219, thereby reducing the overall length of the mating terminal to shorten the length of the signal transmission path on the mating terminal 211. In the present invention, the total length of the mating terminal 211 from the end of the contact portion 213 to the end of the mounting portion 219 does not exceed 15 mm. The mounting portion 219 is inserted into the mounting hole 201 from bottom to top, and is connected to the circuit board 20 by soldering. The length of mounting portion 219 enters the mounting hole 201 does not exceed the depth of the mounting hole 201. The fixing block 212 is disposed on the connecting portion 217 of the mating terminals 211. Specifically, in this embodiment, the fixing block 212 is integrally formed on the connecting portions 217 of the mating terminals 211. The connecting portion 217 and the contact portion 213 are respectively located on opposite sides of the circuit board 20. In this embodiment the connecting portion 217 is located on the lower side of the circuit board 20, and the contact portion 213 is located on the upper side of the circuit board 20 so that the height of the mating terminals 211 on the upper side of the circuit board 20 can be reduced. The front end surface of the recessed portion 204 of the circuit board 20 faces the rear end surface of the fixing block 212. The front end of the circuit board 20 is located at the lower part of the mating space 10 to shorten the transmission path of the signal on the mating terminal. The side of the fixing block 212 facing the contact portion 213 is provided with a plurality of grooves 229 corresponding to the contact portion 213 in the vertical direction to increases the space for the contact portion 213 to elastically deform downward. The height dimension of the two sides of the fixing block 212 is smaller than the height dimension of the middle position of the fixing block 212. The two sides of the fixing block 212 are provided with positioning posts 220 protruding upward, and the two protruding portions 205 of the circuit board 20 are provided with positioning holes 206 that matched with the positioning posts 220.

Each of the foot terminals 23 includes a holding portion 231 held at the rear of the insulating carrier 27, a mounting portion 233 extending upward from the holding portion 231 for mounted on the rear mounting hole 203 of the circuit board 20 and an pin 235 extending downward from the holding portion 231 for mounting to the external device.

The receiving member 29 comprises an accommodating cavity 291 with an opening downward. The magnetic module 25 is accommodated in the accommodating cavity 291. The downward opening of the receiving cavity 291 faces the circuit board 20. The receiving member 29 further comprises a front opening. The accommodating cavity 291 communicates with the partition grooves 121 and the mating space 10 through the front opening.

When assembling the electrical connector 100, the front end of the circuit board 20 extends into the mating space 10 from the rear to the front through the through groove 120, and the mating terminal 211 extends forward into the mating space 10 through the partition groove 121. The contact portion 213 cantilevered in the mating space 10.

In the present invention, the front end of the circuit board 20 is extended to the mating space 10. The contact portion 213 extends backward beyond the mounting portion 219. Using conductive paths on the PCB to replace part of the length of the mating terminals to reduce the overall length of the mating terminals 211, thereby reduce the loss in the process of signal transmission, ensuring the stability and integrity of high-frequency signal transmission, and can achieve the purpose of transmitting high-speed signals of 25 Gbps and above.

In this embodiment, the electrical connector 100 has only one mating space 10 into which the mating connector can be inserted and only one circuit board. The mating terminals 211 and the foot terminals 23 are respectively mechanically and electrically connected to the front end and rear end of the circuit board. Of course, in other embodiments, the electrical connector may also has a plurality of mating spaces arranged horizontally, and each mating space corresponds to a circuit board, or all the mating spaces is commonly connected to one large circuit.

Figure 9:
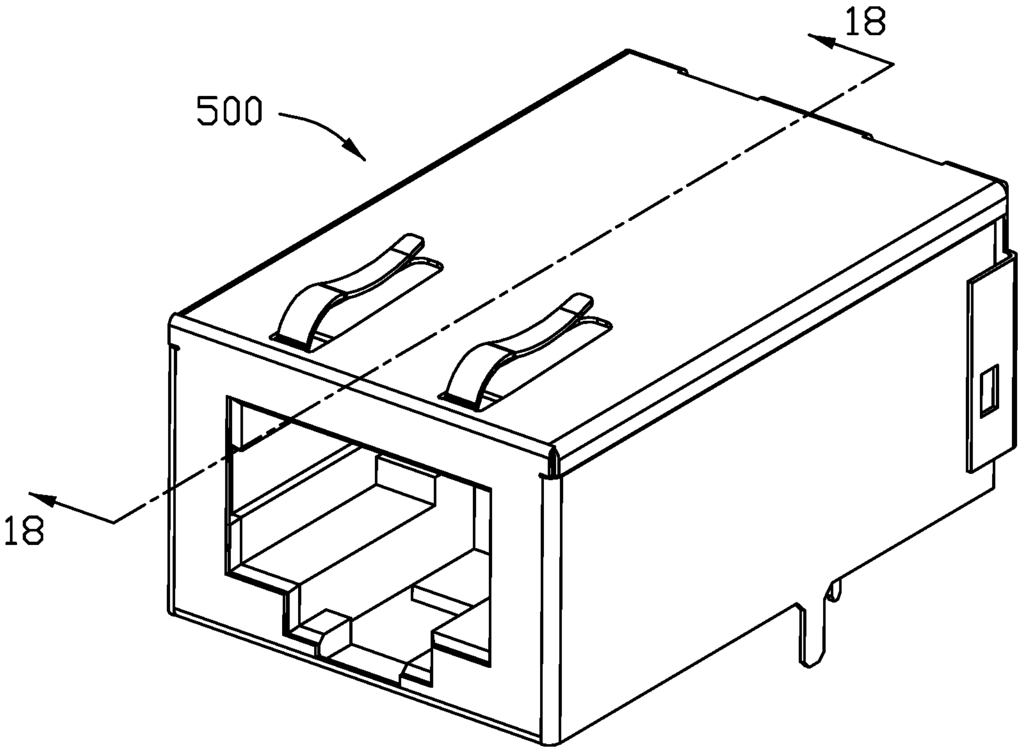
FIG. 9 is a perspective view of a second embodiment of an electrical connector in accordance with the present invention.
Figure 10:
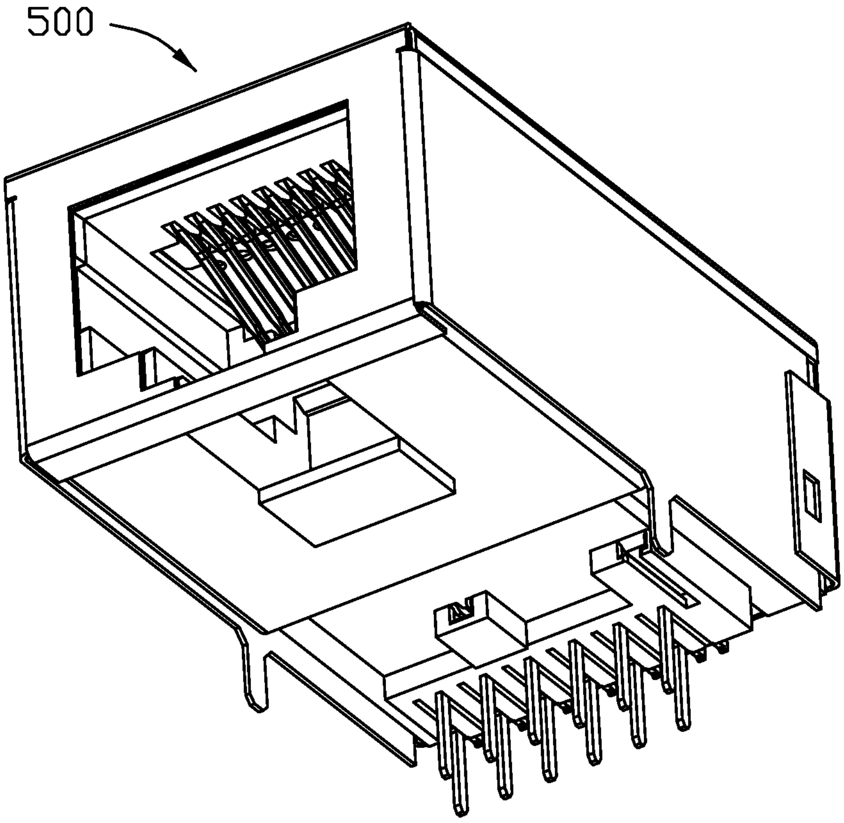
FIG. 10 is another perspective view of the electrical connector in FIG. 9.
Figure 11:
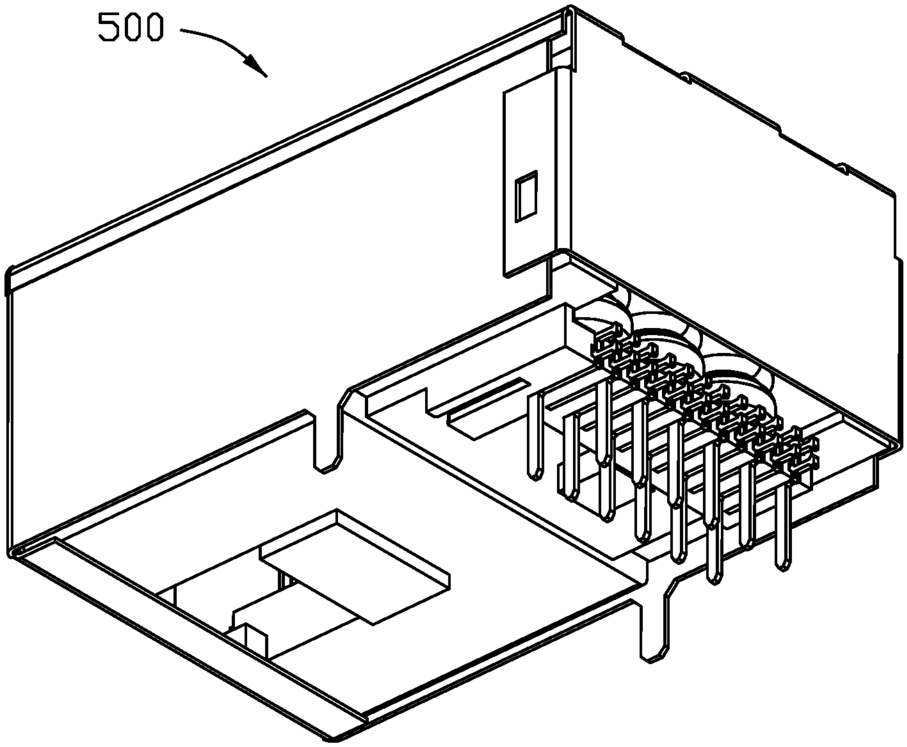
FIG. 11 is another perspective view of the electrical connector in FIG. 10.
Figure 12:
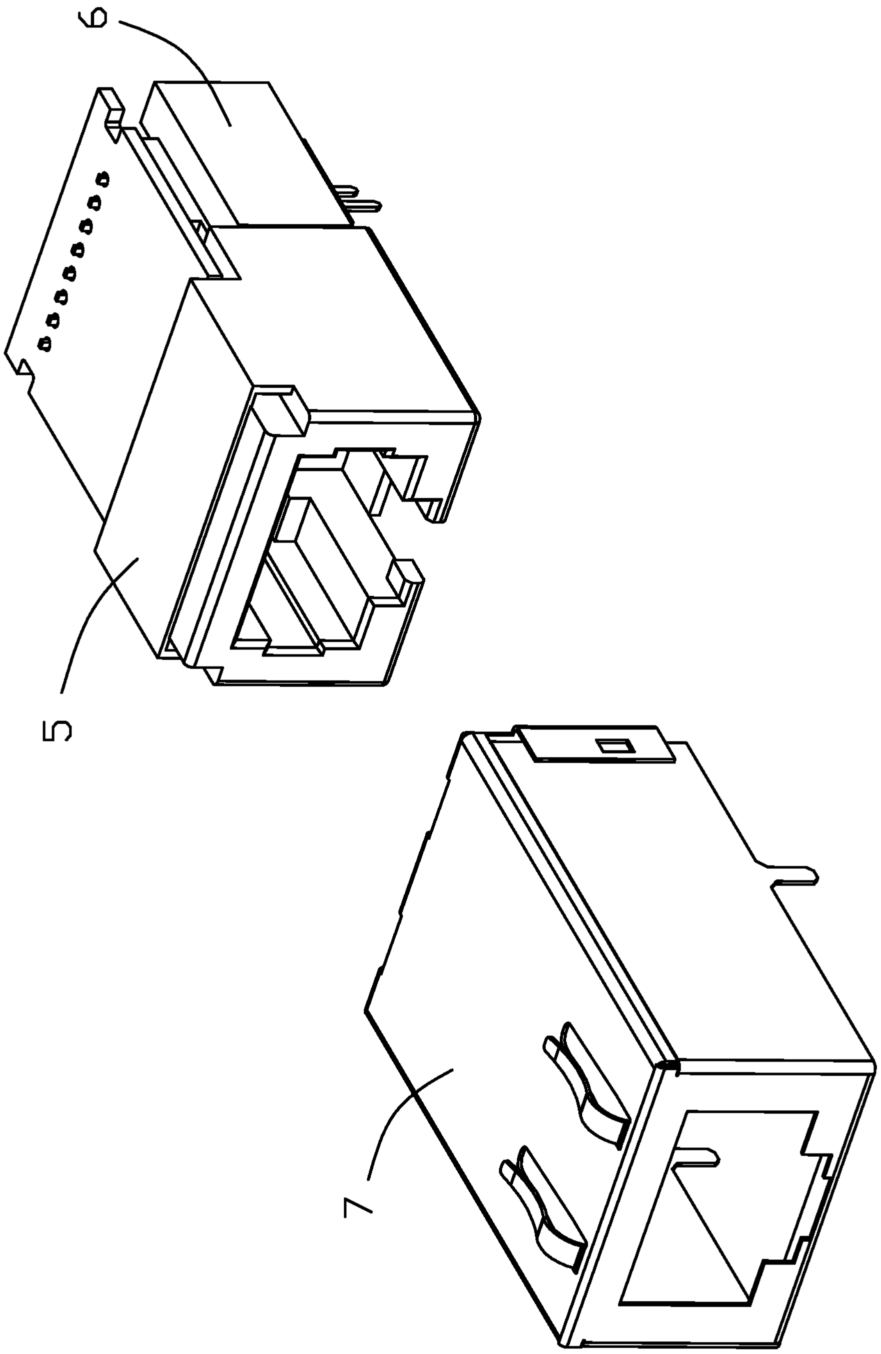
FIG. 12 is an exploded view of the electrical connector in FIG. 9.
Figure 13:
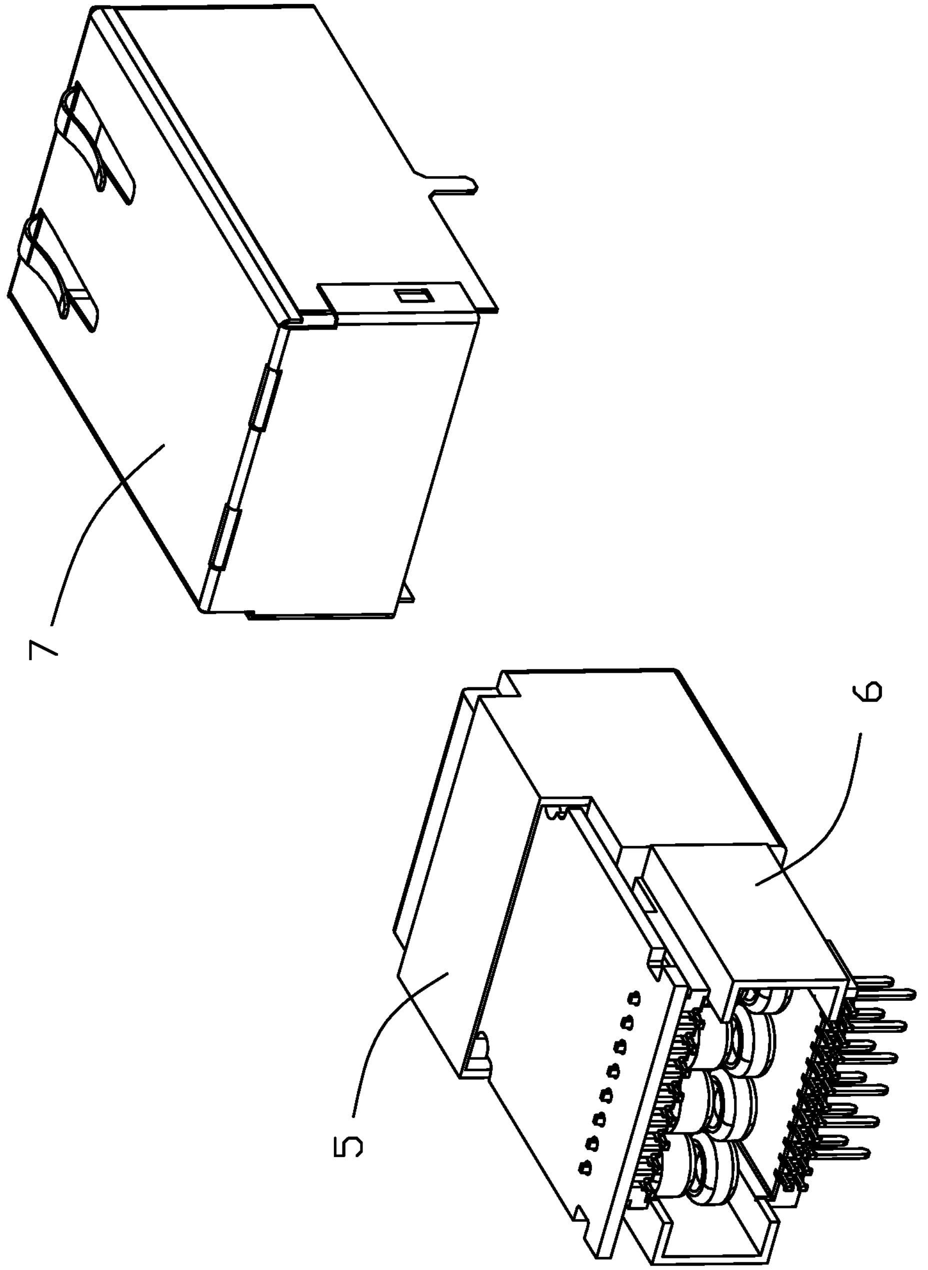
FIG. 13 is another exploded view of the electrical connector in FIG. 12.
Figure 14:
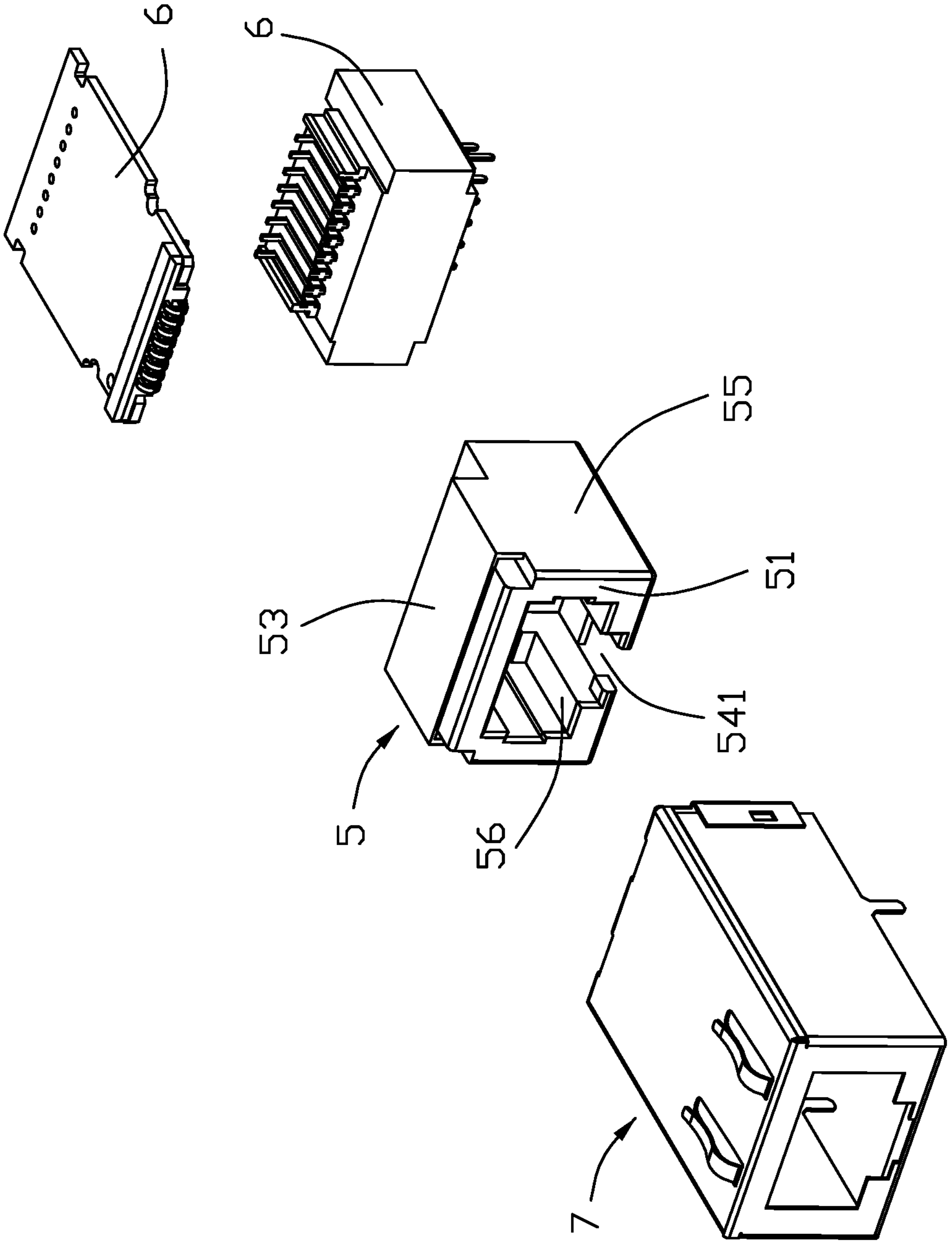
FIG. 14 is a further exploded view of the electrical connector in FIG. 12.
Figure 15:
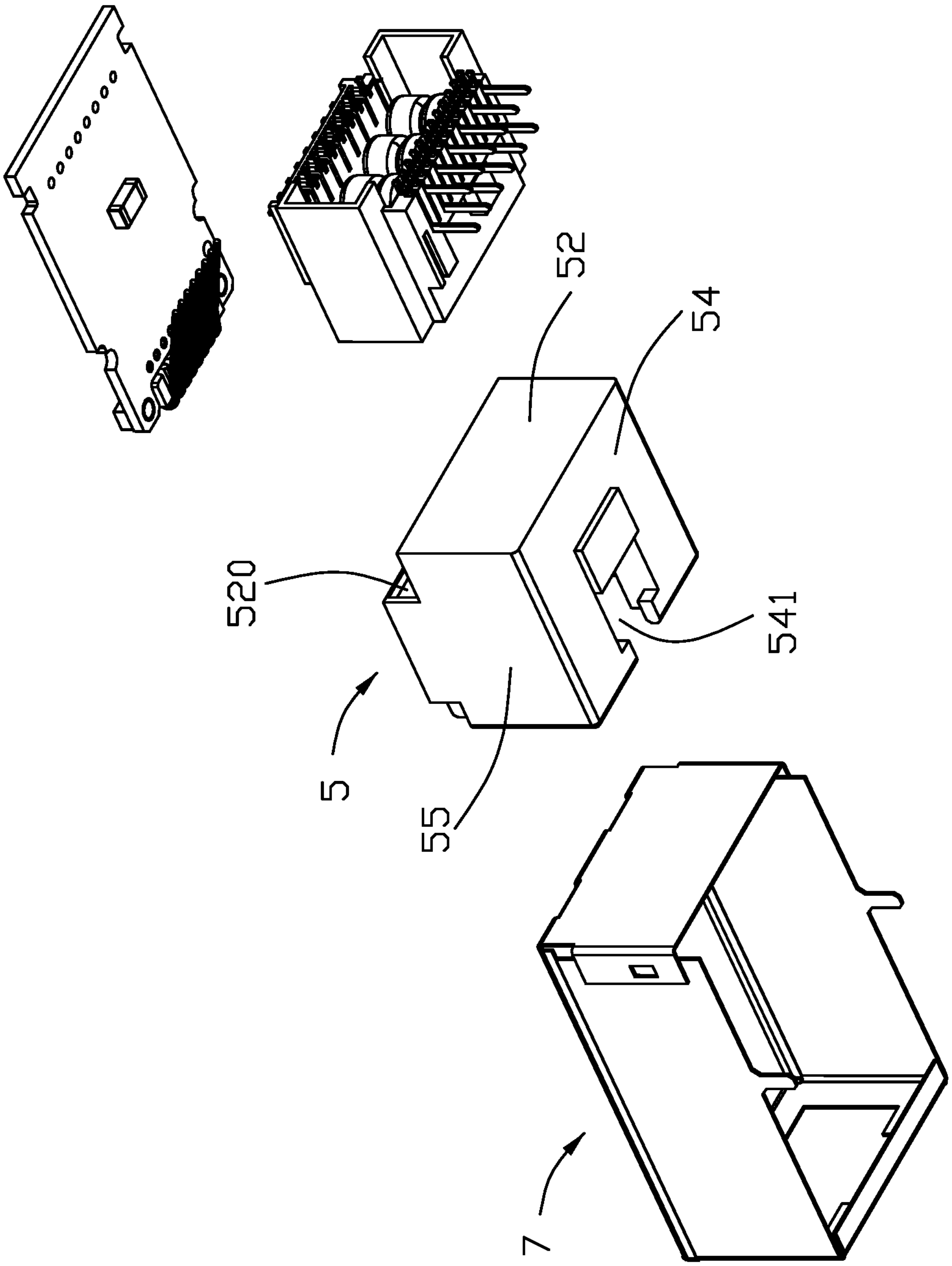
FIG. 15 is another exploded view of the electrical connector in FIG. 14.
Figure 16:
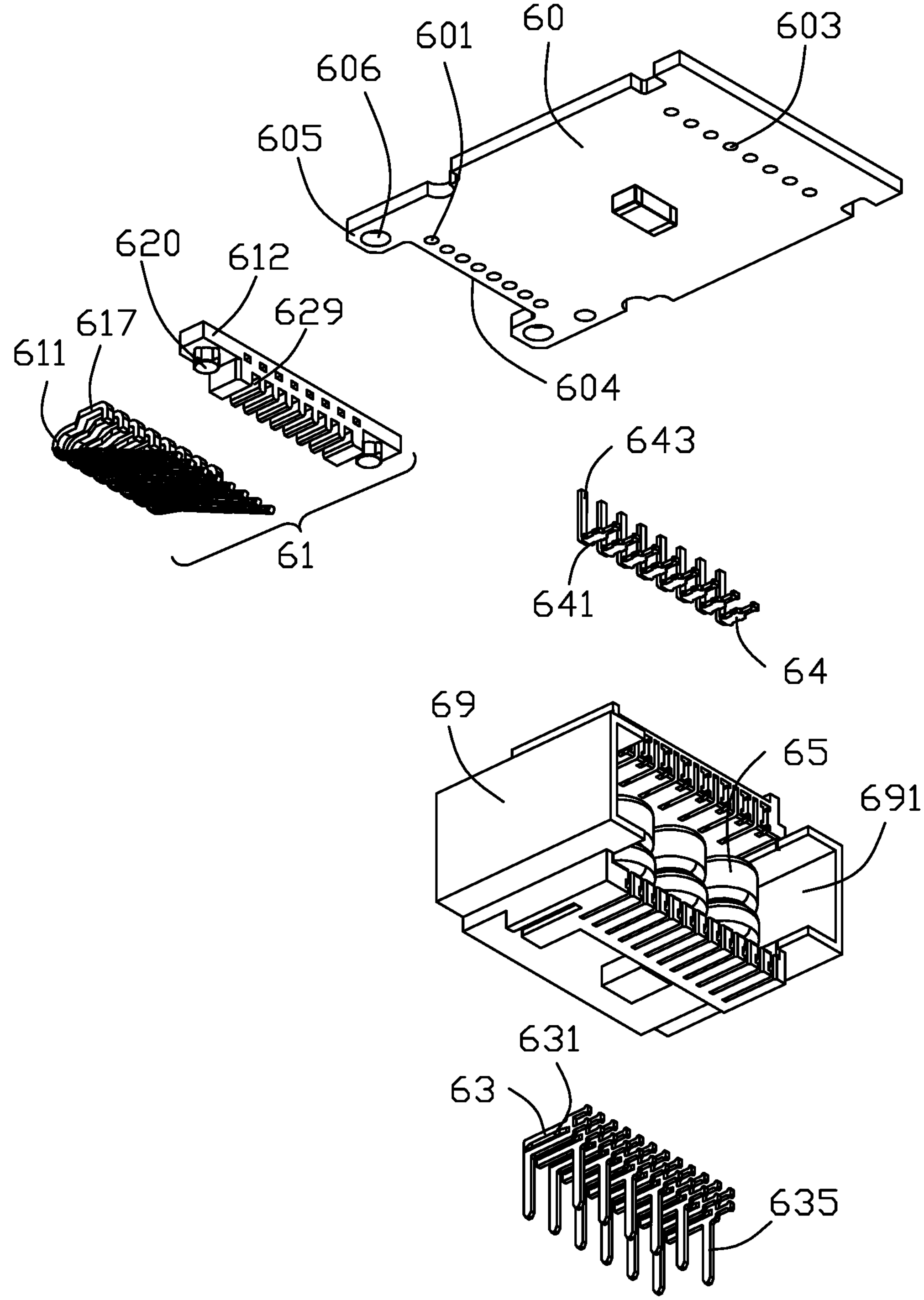
FIG. 16 is an exploded view of the terminal module of the electrical connector in FIG. 9.
Figure 17:
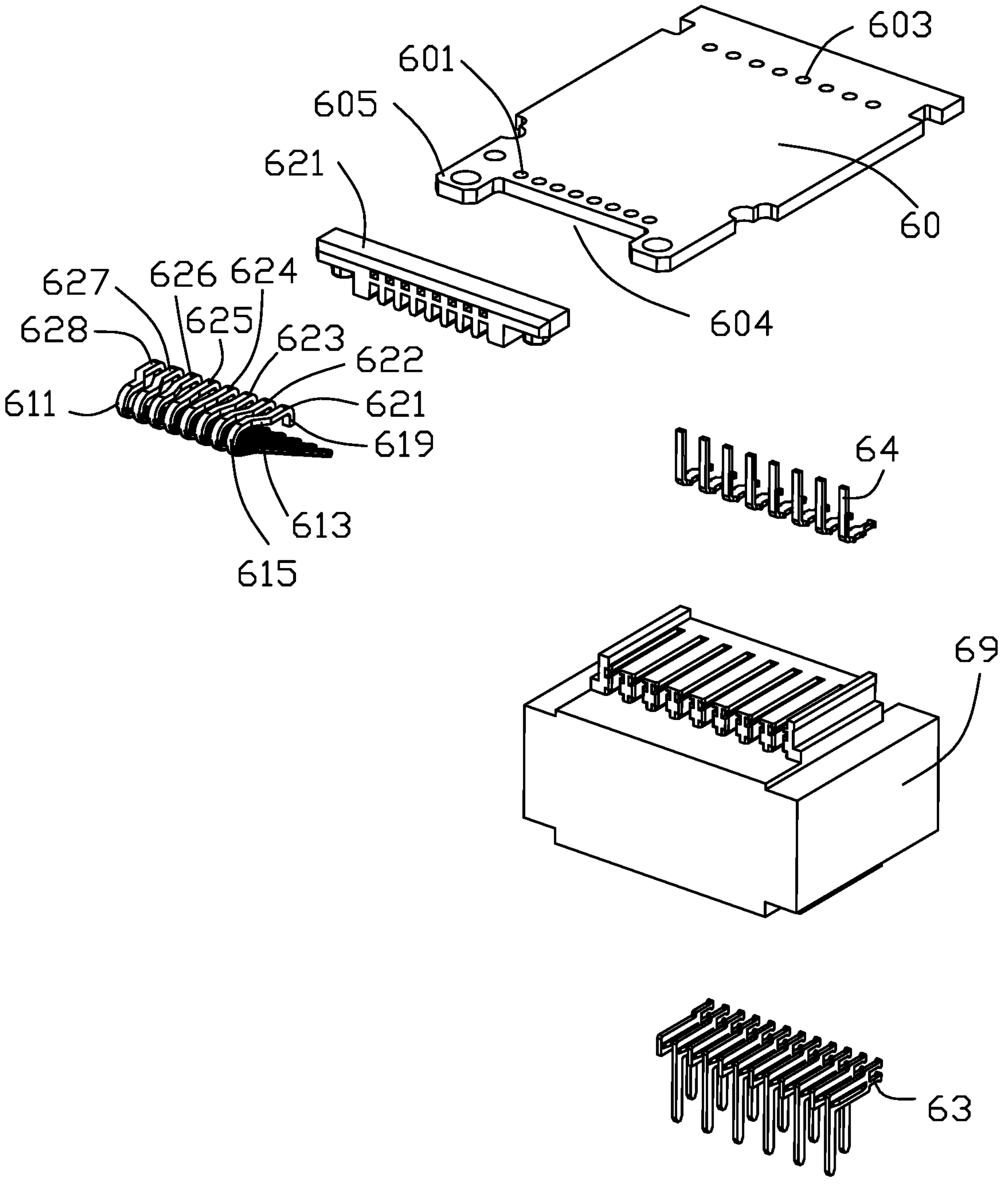
FIG. 17 is another exploded view of the terminal module in FIG. 16.
Figure 18:
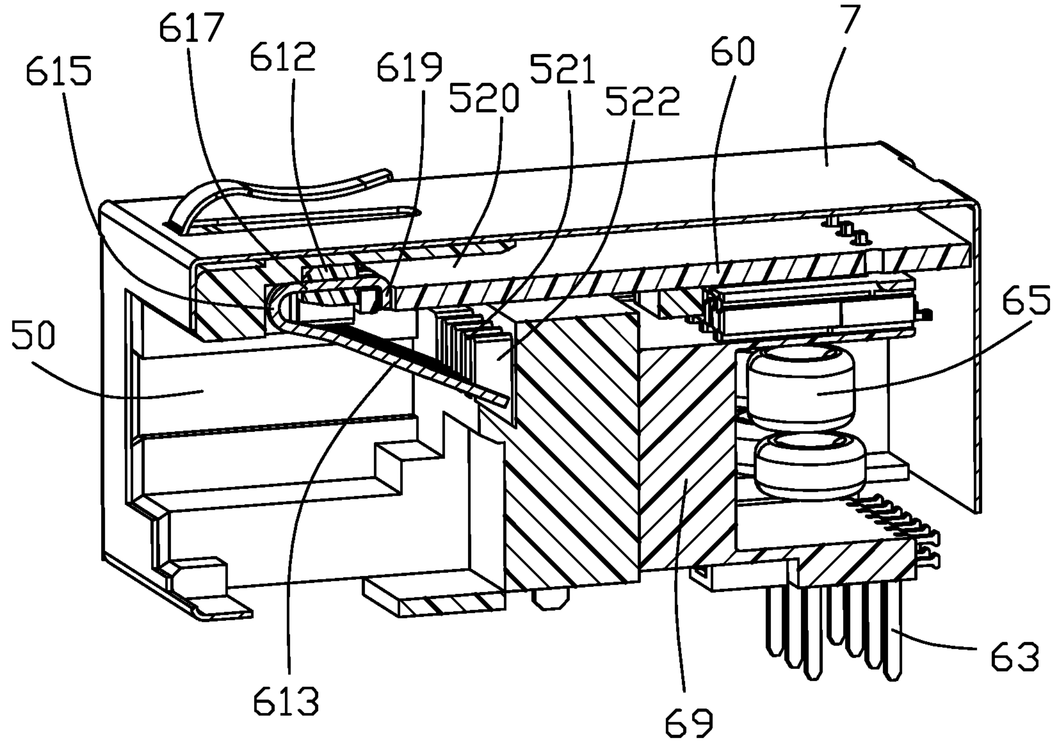
FIG. 18 is a cross-sectional view along line 18-18 of the electrical connector in FIG. 9.

Referring to FIGS. 9-18, a second embodiment of an electrical connector 500 of the present invention is shown. Compared with the first embodiment, the design concepts of the two connectors in the first embodiment and the second embodiment are generally similar, except for some structural changes based on the insertion direction of the mating connector. In the second embodiment, the front end of the circuit board is located at the upper part of the mating space and the through groove 520 is provided on the upper side of the rear wall 52. The snap groove 541 for snap with the snap tail of the mating connector is on the bottom wall 54 of the insulating body 5. The contact portion 613 of the mating terminal 611 is extends obliquely backward and upward. The bending portion 615 of the mating terminal 611 is bent upward and then backward from the front end of the contact portion 613. The mounting portion 619 of the mating terminal 611 is inserted into the mounting hole 601 from top to bottom. The connecting portion 617 is located on the upper side of the circuit board 60, and the contact portion 613 is located on the lower side of the circuit board 60. The circuit board 60 is installed on the upper part of the receiving member 69, so the insulating carrier 27 is not required. Added the intermediate terminal 64 mounted on the receiving member 69 and the circuit board 60. The receiving member 69 comprises a receiving cavity 691 with an opening backward, an upper wall facing the circuit board 60 and a lower wall opposite to the upper wall. The intermediate terminals 64 are mounted on the upper wall, and the foot terminals 63 are mounted on the lower wall. The foot terminals 63 are not directly mounted on the circuit board 60, but electrically connected to the circuit board 60 through the intermediate terminals 64 and the magnetic module 25.

What is claimed is:

1. An electrical connector comprising:

an insulating body defining a mating space; and a terminal module assembled to the insulating body and having a circuit board and a plurality of mating terminals mounted on the circuit board; wherein each of the mating terminals has a contact portion extending obliquely backward, a bending portion bent backward from a front end of the contact portion, a connecting portion extending rearward from a rear end of the bending portion, and a mounting portion vertically extending from a rear end of the connecting portion for mounting on the circuit board; and a front end of the circuit board extends forward into the mating space.

2. The electrical connector as claimed in claim 1, wherein a length of the mating terminal from the end of the contact portion to the end of the mounting portion is not more than 15 mm.

3. The electrical connector as claimed in claim 1, wherein the terminal module includes a foot terminal for mounting to an external device and a magnetic module located between the mating terminal and the foot terminal, the mating terminals are mechanically and electrically connected to the front end of the circuit board, and the foot terminal is mechanically and electrically connected to a rear end of the circuit board.

4. The electrical connector as claimed in claim 1, wherein the terminal module includes a fixing block for fixing the mating terminals, and the fixing block is arranged on the connection portions of the mating terminals.

5. The electrical connector as claimed in claim 4, wherein the front end of the circuit board has a recessed portion retracted backwards and a forward protruding portion located on each side of the recessed portion, and a front end surface of the recessed portion is faced to a rear end surface of the fixing block.

6. The electrical connector as claimed in claim 5, wherein the fixing block has a plurality of grooves corresponding to the contact portions to leave a space for deformation of the contact portions.

7. The electrical connector as claimed in claim 6, wherein the front end of the circuit board is located at a lower part of the mating space, the connection portion is located on a lower side of the circuit board, and the contact portion is located on an upper side of the circuit board.

8. The electrical connector as claimed in claim 7, wherein the two sides of the fixing block are provided with positioning posts, and the circuit board is provided with positioning holes matched with the positioning posts.

9. The electrical connector as claimed in claim 7, wherein the circuit board comprises holes for accommodating the mounting portions of the mating terminals, and the mounting portions are inserted into the corresponding mounting holes from the lower side of the circuit board and soldered to the circuit board.

10. An electrical connector comprising:

an insulating body;

a circuit board mounted on the insulating body; and a plurality of mating terminals mounted on the circuit board; wherein each of the mating terminals has a contact portion extending obliquely backward, a bending portion bent backward from a front end of the contact portion, a connecting portion extending rearward from a rear end of the bending portion, and a mounting portion vertically extending from a rear end of the connecting portion and mounted on the circuit board; and the contact portion extends backward beyond the mounting portion.

11. The electrical connector as claimed in claim 10, wherein a front end of the circuit board is located at an upper part of the mating space.

12. The electrical connector as claimed in claim 10, wherein the connection portion is located on an upper side of the circuit board, and the contact portion is located on a lower side of the circuit board.

13. The electrical connector as claimed in claim 10, wherein the connection portion and the contact portion are respectively located on opposite sides of the circuit board.

14. The electrical connector as claimed in claim 13, wherein the circuit board comprises holes for accommodating the mounting portions, and a length of the mounting portion entering the hole is less than a depth of the mounting hole.

* * * * *